March 27, 1956     R. E. SCHULZE     2,739,917
METHOD OF MAKING CLOSED FLUID PRESSURE CONTAINERS
Filed Dec. 8, 1953
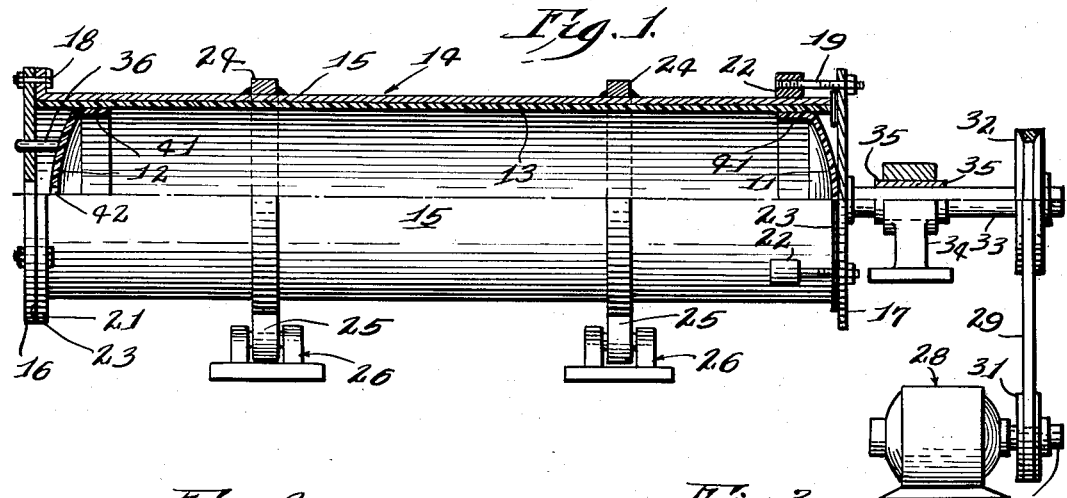
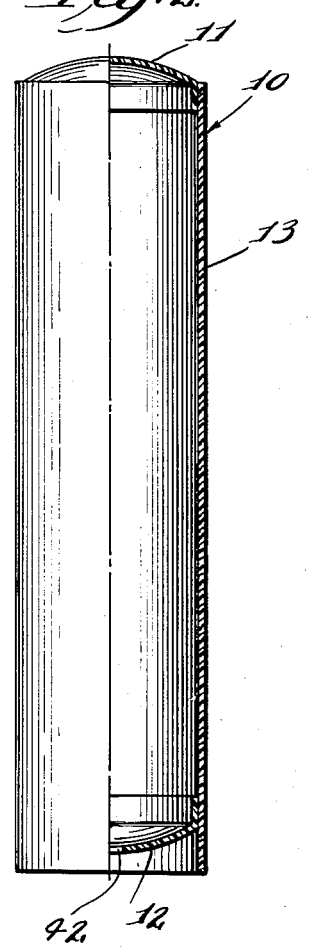
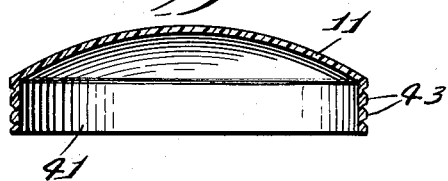
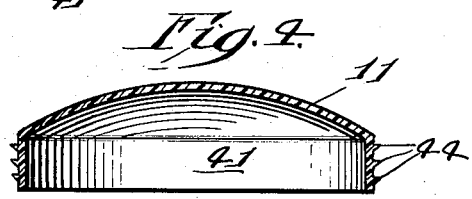
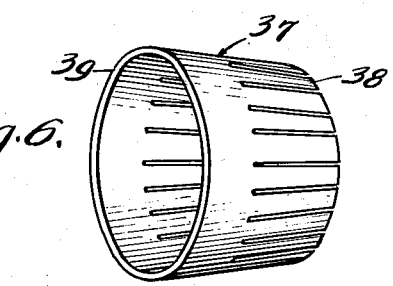
Inventor.
Robert E. Schulze.
By Wilson & Geppert
Attorneys.

United States Patent Office 2,739,917
Patented Mar. 27, 1956

2,739,917

METHOD OF MAKING CLOSED FLUID PRESSURE CONTAINERS

Robert E. Schulze, Deerfield, Ill., assignor to Culligan, Inc., Northbrook, Ill., a corporation of Delaware Application December 8, 1953, Serial No. 396,881

9 Claims. (Cl. 154—83)

The present invention relates to the manufacture of a tank, container or receptacle of plastic parts and more particularly to a novel method or manner of combining and joining such parts to effect and maintain a positive seal therebetween.

Plastics and synthetic resins are available for the production of materials having high strength and high impact characteristics. To enhance these characteristics in the resulting materials, the plastic or resins to be employed may be reinforced by the addition of filaments or fibers such as glass, rayon, nylon, etc. These reinforcing filaments or fibers may be continuous or severed and thus provide fibers of any desired or controlled length, which may be dispersed or arranged in the plastics or resins in a definite pattern or they may be heterogeneously arranged or disposed therein depending upon the characteristics or properties desired in the final product.

Although many processes and techniques have been developed for the production of such reinforced plastics, they are primarily concerned or adaptable with designs or products capable of production as a single or integral unit. However, many products or designs are incapable of production in a single operation or as a single integral unit and require fabrication from multiple parts which are united or joined together into a final assembly. Where such final design or the resulting product is fabricated from an assembly or combination of parts and where such ultimate assembly of multiple parts is employed as a container and subjected to various influences including relatively high internal pressure, the points of juncture or connection of such parts have not been capable of withstanding this internal pressure or maintaining the contents without leakage.

Considerable research, time and money have been expended in unsuccessful attempts to effect and maintain a tight closure or joint between the parts and to maintain an effective seal over an extended period of time. One of the most common methods employed in joining plastic parts is by the use of cements or adhesives, but most such cements or adhesives must be employed as solvent solutions or suspensions and as the solvents or suspension agents evaporate shrinkage and porosity develop in the cement or adhesive joining the parts, resulting in a weakening of the point and/or precluding the formation and maintenance of an effective fluid-tight seal.

Other cements are mixtures of chemical compounds which may be considered as essentially having 100% solids as they polymerize, without vaporization of any components, when they set or cure. However, even though these compounds are 100% solids, they are incapable of being employed in many cases due to the fact that as they polymerize they undergo a relatively high shrinkage and the resulting joint may fail. Furthermore, as these materials continue to cure or polymerize with time, defective parts or potentially defective parts or joints cannot be detected and failures in actual use or non-use may result as they age. This condition is most critical if the plastic parts are designed to form a container or receptacle for holding fluids, and especially liquids under pressure.

Another problem that arises in the assembly of plastic parts is that relatively close tolerances must be maintained between the parts to be joined if any substantial degree of strength is to be obtained and retained in the resulting joint. If such tolerances are too close, the adhesive or cement intended to join the parts may be wiped from the joint or overlapping parts during assembly and the resulting joint would be weak or ineffective. If such tolerances are too great, an excess of adhesive or cement is required and an excessive amount of shrinkage may ensue and result in cracking or opening of the joint.

The present invention obviates all of the above noted and other objections inherent in such prior methods of uniting or joining preformed plastic parts, and it is an important object of the present invention to provide a novel method and means or manner of producing containers or receptacles and especially closed vessels for containing liquids or other fluids under pressure.

Another important object of the present invention is the fabrication of a closed vessel, container or tank constructed or formed of fiberglass reinforced polyester resin. In its preferred embodiment this resin is a mixture of a commercially available resin from the group of polymerizable unsaturated polyhydric alcohol-polycarboxylic acid polyesters, monomeric styrene and a suitable catalyst of the peroxide type. While it is preferred to use the polyester type resin for this application, other resins such as the epichlorohydrin type or maleicanhydride alkyd type may also be employed.

In forming a closed vessel or tank of the type disclosed for containing a liquid or fluid under pressure, two general methods of fabrication have been considered. One involves making or fabricating the vessel or tank in two halves and cementing the halves together to form the closed vessel. The other involves forming or fabricating the cylindrical body or shell and the upper and lower heads separately and then cementing or adhesively joining these heads in place in the opposite ends of the cylindrical body or shell. Although the separate fabrication of the heads and cylindrical body may be accomplished with available equipment, the uniting of these separate plastic parts to form and maintain a fluid-tight joint or seal therebetween has posed a problem that has been solved by the present invention.

It is, therefore, an important object of the present invention to provide a novel method of constructing a closed vessel in which the cylindrical shell or body of the vessel is centrifugally cast or fabricated and secured directly to the preformed upper and lower heads.

In this novel method the previously considered undesirable shrinkage properties or characteristics of the resins are employed in effecting a fluid-tight seal between the component parts, and it is a further important feature that differential stresses and shrinkage causing aging failures are eliminated in the joint sections.

Another important object of the present invention is to provide a novel method of uniting the heads to the cylindrical shell in such manner that no special machining of the joining areas of the component parts is required, normal mold tolerances being sufficiently accurate for uniting the component parts in the manner proposed. Although the adjacent or adjoining and overlapping surfaces to be united need no special treatment or surfacing, the present invention further comprehends that such surfaces may be undulated, serrated or roughened, if desired.

Another novel feature of the present invention is the achievement of positive, high strength joints by the present novel method and manner of fabrication, without the use of additional cements or adhesives.

A further novel feature is that the assembly line for the secondary cementing operations is eliminated and thereby making a substantial saving in the equipment and labor required by prior methods.

A still further feature of the present invention is that the straight flange of the heads which telescopes within the encompassing shell of the closed vessel or container is pre-stressed so as to assure and maintain positive sealing pressure against the adjoining and overlapping surface of the shell and oppose the occurrence of leaks.

Further objects are to provide a method and manner of construction of maximum simplicity, efficiency, economy and ease of assembly and operation, and such further objects, advantages and capabilities as will later more fully appear and are inherently possessed thereby.

In the drawing:

Figure 1 is a view, the upper part in vertical cross section and the lower part in side or front elevation, of a vessel and a centrifugal casting machine used in the process of fabricating such a fluid-tight vessel, container or tank by uniting and sealing the flange of the opposite heads to the encompassing surface of the shell or cylindrical body adjacent the opposite ends of the vessel.

Fig. 2 is a view, part in front or side elevation and part in vertical cross section taken longitudinally through a vessel, container or tank after fabrication has been completed.

Fig. 3 is an enlarged view in vertical cross section through one of the heads for the vessel in which the exterior of the flange which is joined to the cylindrical shell is undulated, notched or channelled for enhancing its locking and sealing characteristics.

Fig. 4 is a view similar to Fig. 3 but with the exterior cylindrical surface of the flange serrated.

Fig. 5 is a view similar to Figs. 3 and 4 but with the flange roughened in any suitable manner.

Fig. 6 is a perspective view of an expansible guide member adapted to be inserted into an end of the preformed mat for the cylindrical shell to assist in locating the heads within the ends of the mat.

Referring more particularly to the disclosure in the drawing, the novel method and manner of producing or fabricating a closed, fluid-tight vessel or container 10 as shown in Fig. 2, comprises preparing or forming the dished heads 11 and 12 providing the top and bottom end closures of the vessel or container and the method of attaching these heads to a shell or cylindrical body 13.

The heads 11 and 12 may be produced in any suitable manner from a plastic composition in which the resin is preferably reinforced. They may be made by means of male and female wood hand molds conforming or following the contours of the finished parts, by tailoring and adding sheets of fiberglass mat so as to conform to the contours of the mold, then pouring sufficient resin over the fiberglass mat to substantially fill with some slight excess the voids or spaces between the glass fibers when the mold is closed, then closing the mold and maintaining it closed by clamping or other suitable means, curing the resin, and then removing the cured molded parts which normally are then ready for assembly with the cylindrical shell 13 in the manner hereinafter disclosed. On occasion, it may be necessary to remove mold flash caused by an excess of resin or due to wear on the mold.

If desired, in production the prefabricated parts or heads 11 and 12 may be made in matched metal molds in molding presses after preformed shapes of reinforcing fiberglass have been produced in felting machines and the like.

The centrifugal casting machine shown in Fig. 1 consists of a hollow mandrel assembly 14 including a cylindrical container or housing 15 of an internal diameter to conform accurately to the external diameter of the cylindrical tank shell 13, the mandrel being honed on its interior to facilitate removal of the finished cast assembly and to provide a smooth finish to the outside of the fabricated tank or vessel 10. End plates 16 and 17 are secured to the mandrel by bolts or other locking means 18 and 19 spaced about the periphery of these plates, the locking bolts 18 projecting through an external flange 21 on the housing or container 15 of the mandrel, and the locking bolts 19 being affixed or anchored to spaced lugs 22 on the housing or container.

Gaskets 23 at each end of the mandrel provide a resin-tight seal between the housing or container 15 of the mandrel and the end plates 16 and 17. Secured to the exterior of the cylindrical body 15 of the mandrel 14 are longitudinally spaced, circumferential tires 24 which have rotative contact with confining wheels 25 preferably placed equi-distant about the tires. These wheels are mounted and journalled in an external mounting structure 26 and permit the mandrel 14 to rotate within their confines.

To rapidly rotate the mandrel 14, the drive shaft 27 of a motor 28 is connected through a suitable V-belt 29 and pulleys 31 and 32 to a horizontal, driven shaft 33 secured or rigidly affixed to the end plate 17. The driven shaft 33 is journalled in a bearing 34, with collars 35 on the shaft 33 maintaining the alignment of the tires 24 with the wheels 25. One or more location pins 36 projecting through the end plate 16 position the preformed head 11 of the tank assembly in the inner cylindrical wall of the outer shell 13 of the tank, container or vessel.

In the novel cylindrical casting method of the present invention, the first step is to make a preform of the cylindrical shell 13. In such formation, commercially available reinforcing fibers or filaments of any desired length are employed. These are supplied or available in mat form in rolls of various widths and thicknesses. A mat of a width equivalent to the distance between the end plates 16 and 17 is preferably employed, the length of the mat cut from the supply roll being such that when spirally wound and compacted in the cylindrical mandrel of the centrifugal casting machine, the number of layers employed will result in a desired wall thickness. To facilitate inserting and locating this preform into the centrifugal casting machine, the mat is preferably first wound on a tube of substantially lesser diameter than the internal diameter of the cylindrical container 15 of the mandrel 14.

With the end plate 16 of the mandrel removed, the tube and encompassing mat are introduced into the hollow mandrel 14 with the spiral winding wound in a direction opposing the direction of rotation of the mandrel in the subsequent operations, after which the supporting tube is removed leaving the mat for forming the cylindrical shell 13 in the mandrel. When the mat is properly located or positioned, the end pate 16 is replaced and bolted to the mandrel whereby the mat is located and retained in its proper operative position. The motor 28 is then started and the mandrel 14 caused to rotate, whereupon the spirally wound mat will have a tendency to unwind and hug tightly and conform to the internal contour of the cylindrical container 15 of the mandrel due to the centrifugal force resulting from rotating the mandrel at high speed and to the unwinding action of the mat. A dilute solution of acetone and rosin is preferably added and the acetone allowed to evaporate leaving a coating or film of the rosin deposited on the mat whereby the preformed and compact mat maintains a relatively firm cylindrical shape when the mandrel is stopped preparatory to the next operation or step in the novel method.

When the mat has been preformed as above outlined, the motor 28 is stopped to stop rotation of the mandrel, the end plate 16 is removed and the container heads 11 and 12 are inserted into the mat and located in the position shown in Fig. 1. To facilitate and assist in such location, an expansible guide member 37 of substantially frusto-conical shape is preferably inserted into the exposed, open end of the cylindrical mat. Then in sequence the head 11 and the head 12 are inserted into the cylindrical mat through the reduced or flared open end 38 of the guide member 37. The enlarged, outer end 39 of the guide member 37 being of greater internal diameter than the external diameter of the flange 41 of each of the heads 11 and 12, these heads may be readily inserted into the enlarged end of the guide member and forced through the expansible inner, reduced end 38 thereof into the interior of the mat. This guide member 37 may be of thin metal and other suitable resilient material with the reduced end 38 longitudinally slotted to provide multiple resilient or spring fingers which when the reduced end 38 is inserted into the performed mat, are capable of being expanded into contact with the interior of the mat at its outer or left hand end as viewed in Fig. 1, thereby preventing disturbance of the preformed mat by the insertion of the heads.

These heads when arranged within the cylindrical mat in the mandrel should fit snugly and conformably against the interior of the mat, the external diameter of the flange 41 of these heads being equal to or preferably slightly larger than the internal diameter of the completed, cylindrical shell 13 of the vessel or container 10.

When the heads have been inserted and properly located in the preformed mat in the position shown in Fig. 1, the end plate 16 is replaced and secured to the mandrel by the locking bolts 18 and the mandrel 14 is rotated by the motor 28 at a relatively high peripheral speed. Although excellent results have been secured when the mandrel was rotated at a peripheral speed of approximately 4000 feet per minute, the peripheral speed may vary through a relatively wide range from approximately 1500 to 8000 feet per minute. Resin of the type disclosed is then added to the interior of the rotating cylindrical mat through a preferably centrally located opening 42 in the head 12.

The amount of resin that is added to the interior of the mat is such as to fill the voids of interstices between the mat fibers or filaments with sufficient excess to produce and maintain a covering film over the innermost fibers or filaments and give a smooth finish to the interior of the vessel. Although the resin may be allowed to run in and seek its own level, it is preferable to distribute the resin over the entire inner surface of the mat by means of a spray which will cause the innermost fibers or filaments to lie down and compact more tightly and result in a highly compacted and densified cylinder or shell 13 when fabrication has been completed.

The fluid nature of the resin causes it to flow freely through the voids of interstices in the mat and completely saturate and impregnate the mat throughout its full length between the end plates 16 and 17, with the resin level sufficiently deep to envelop the outer surface of the flange 41 of the heads 11 and 12. As described above, the resin contains a catalyst which causes the resin to set or polymerize into a solid mass while maintaining centrifugal force on the mass. If desired, heat may be applied in any suitable manner to the mass to accelerate the setting of the resin. This may be by means of infrared lamps directed onto the mandrel, by confining the mandrel in an oven or steam chamber, or by providing each head with an opening through which hot air or other fluid may be directed into and through the assembly.

As the resin polymerizes the molecules become more intimately or closely associated with each other and the mass contracts or shrinks. The rigid and similarly contoured heads 11 and 12 having been originally and prior to their assembly in the cylindrical mat completely cured, and the flange 41 of each being encompassed by the polymerizing cylindrical shell 13, this shell contracts and develops a most intimate, high pressure sealing contact with the heads. As the resin is somewhat plastic until its cure is complete, the contraction pressure develops a homogeneous and most effective joint or integral bond uniting the parts with a substantially indefinable joint line. This shrinkage or contraction resulting in the component parts being intimately bonded together has the further advantage in that it facilitates ready removal of the completed vessel 10 from the mandrel when the shrink curing and bonding process has been completed and the end plate 16 removed.

As shown in Figs. 3, 4 and 5, the external surface of the flange 41 of the heads 11 and 12 which is joined or bonded to the shell 13, may be suitably undulated or grooved as at 43 in Fig. 3, serrated as at 44 in Fig. 4 or otherwise roughened as at 45 in Fig. 5, if desired.

Having thus disclosed the invention, I claim:

1. In the method of producing a vessel formed of fiber-reinforced plastic and including a cylindrical shell and a previously formed bottom and top head for the shell with each head having a flange fitting conformably into and joined to the shell adjacent its opposite ends, comprising the steps of introducing a densified cylindrical mat of reinforcing fibers into a hollow mandrel, locating a flange of a head into each end of the preformed mat in the mandrel, supplying a suitable resin to the fibers of the mat in an amount sufficient to fill the interstices of the mat, impregnate the fibers and distribute and maintain a covering over the innermost fibers to give a substantially smooth finish to the interior of the shell, and rapidly rotating the mandrel while said resin is being supplied to flow the resin into the interstices of the mat and envelop said flanges of the heads, and when the cure of the resin in the shell has been completed, the contracting pressure of the shell upon the flanges develops a most intimate bond and sealing contact therebetween.

2. In the method of producing a container formed of fiber-reinforced plastic including a cylindrical shell and uniting therewith a bottom head and a top head for the shell with each head having a flange fitting conformably into the opposite ends thereof, comprising the steps of introducing a densified cylindrical mat of reinforcing fibers into a hollow mandrel, locating a flange of a head in each end of the preformed mat in the mandrel, supplying a free-flowing resin to the fibers of the mat in an amount sufficient to fill the interstices of the mat, impregnate the fibers and distribute and maintain a covering of the resin over the innermost fibers to give a substantially smooth finish to the interior of the cylindrical shell, and rapidly rotating the mandrel to flow the resin supplied thereto into the interstices of the mat and envelop said flanges of the heads, and when the cure of the resin in the shell has been completed, the contracting pressure of the shell upon the flanges and the resin unites the heads to the shell and provides a most intimate bond and sealing contact therebetween.

3. In the method of producing a container of a plastic composition assembled from multiple parts including a cylindrical shell and a previously formed part having a peripheral flange to be united to the shell by a rigid fluid-tight sealing joint, the steps of introducing a densified cylindrical mat of reinforcing fibers into a hollow rotatable mandrel, locating and assembling the flange within the preformed mat in the mandrel, supplying a free-flowing resin to the fibers of the mat in an amount sufficient to fill the interstices of the mat and to distribute and maintain a covering of resin over the innermost fibers to give a smooth finish to the interior of the cylindrical mat, and rapidly rotating the mandrel to flow the resin supplied thereto into the interstices of the cylindrical mat to form a cylindrical shell of fiber-reinforced plastic and to envelop and integrally join the flange to the shell.

4. In the method of producing a container formed of fiber-reinforced cylindrical plastic shell and joining thereto a bottom head and a top head for the shell with each head provided with an annular flange slightly greater in diameter than the internal diameter of the shell and adapted to fit into and be united by a fluid-tight sealing bond with the interior of the shell, comprising the steps of introducing a densified cylindrical mat of reinforcing fibers into a hollow mandrel, locating the flange of each head within the preformed mat in the mandrel, supplying a suitable resin to the fibers of the mat in an amount sufficient to fill the interstices of the mat, and rapidly rotating the mandrel to flow the resin supplied thereto into the interstices of the cylindrical mat to form an impervious cylindrical shell and to envelop the flanges and intimately and positively join them to the cylindrical shell when the cure of the resin has been completed and the shrinkage of the shell upon curing exerts a contracting pressure that develops a most intimate bond and sealing contact therebetween to provide a fluid-tight seal.

5. In the method of centrifugally casting and intimately uniting a shell to an external surface of a substantially rigid, previously formed part, comprising the steps of introducing into the interior of a hollow rotatable mandrel a substantially cylindrical and densified mat of reinforcing fibers, locating the completely formed part in the preformed mat, supplying a suitable resin containing a catalyst to the interior of the mat in an amount sufficient to fill the voids between the fibers of the mat, and rapidly rotating the mandrel, the preformed part and the mat for distributing the resin over the entire inner surface of the mat and flowing the resin freely through the voids of the mat and between the adjoining surfaces of the completely formed part and the encompassing mat, and as the resin in the mat is cured to form the shell, the shell contracts and develops an intimate, high pressure contact with the external surface of the previously formed part to unite said part and shell and when the cure of the resin has been completed a most intimate bond and sealing contact is effected.

6. In the method of centrifugally casting and intimately uniting a reinforced plastic shell to a part of like material, comprising the steps of introducing into the interior of a hollow rotatable mandrel a densified cylindrical mat of reinforcing fibers, locating in the mat the part to be joined thereto, supplying the mat with a free-flowing resin in an amount sufficient to fill the voids between the fibers of the mat, rapidly rotating the mandrel with the mat and the part to be joined to form the shell to distribute the resin over the entire inner surface of the mat and flow between the adjoining surfaces on the part to be joined and the encompassing mat to simultaneously unite the part thereto, and as the resin is cured the shell contracts and develops an intimate, high pressure contact with the part to be joined to unite said part and shell and effect an intimate bond and seal therebetween.

7. In the method of producing a container formed of fiber-reinforced plastic and including a cylindrical shell and a previously formed bottom and top head for the shell with each head provided with an annular flange of a diameter not less than the internal diameter of the shell and adapted to fit into and be united by a fluid-tight sealing bond with the interior of the shell, comprising the steps of introducing a densified cylindrical mat of reinforcing fibers into a hollow rotatable mandrel having an internal diameter conforming to the external diameter of the completed shell, locating the flange of each head within the preformed mat in the mandrel, supplying a suitable resin to the fibers of the mat in an amount sufficient to fill the interstices of the mat and to distribute and maintain a covering of the resin over the innermost fibers to give a substantially smooth finish to the interior of the cylindrical shell, and rapidly rotating the mandrel with its contained mat and heads to be joined thereto to flow the resin into the interstices of the mat and envelop said flanges with the adjacent surfaces of the cylindrical mat and these flanges intimately and positively joined and sealed to the resulting shell upon curing of the resin with the shell exerting a contracting pressure upon the flanges.

8. In the method of centrifugally casting and uniting a fiber-reinforced plastic part to a previously formed part with said parts having tightly conforming telescoped surfaces to be joined, the steps of inserting the previously formed part into an end of a preformed cylindrical part comprising a densified mat of reinforcing fibers and joining the telescoped surfaces of said parts by supplying to the mat of the cylindrical part a free-flowing resin in an amount sufficient to completely impregnate the mat of fibers including the telescoped surfaces, and rapidly rotating said parts in position for assembly to flow the resin supplied thereto and impregnate the mat of fibers including its telescoped surface to thereby centrifugally cast the one part and simultaneously unite both parts, and upon curing of the resin the parts are joined in integral assembly.

9. In the method of uniting fiber-reinforced plastic parts having tightly conforming telescoped surfaces, the steps of supplying a previously formed part to be joined at its periphery to an encompassing part consisting of a preformed, densified mat of reinforcing fibers, inserting the formed part into telescoped relation with the preformed mat, supplying a free-flowing resin to the interior of said mat in an amount sufficient to impregnate the mat and flow between the fibers and the telescoped surfaces, and rapidly rotating said parts in assembled relation to flow said resin into the voids of the mat including the telescoped surfaces to thereby centrifugally cast and unite the encompassing part with the other previously formed part to form a fluid-tight seal therebetween.

References Cited in the file of this patent

UNITED STATES PATENTS

| | | |
|---|---|---|
| 2,349,549 | Hardman et al. | May 23, 1944 |
| 2,409,486 | Hagen et al. | Oct. 15, 1946 |
| 2,455,248 | Hagen et al. | Nov. 30, 1948 |
| 2,601,266 | Ducatman et al. | June 24, 1952 |
| 2,614,058 | Francis | Oct. 14, 1952 |
| 2,633,605 | Brucker | Apr. 7, 1953 |
| 2,644,198 | Crawford et al. | July 7, 1953 |